(12) United States Patent
Radu et al.

(10) Patent No.: US 7,287,885 B2
(45) Date of Patent: Oct. 30, 2007

(54) AUTOMOTIVE STORAGE COMPARTMENT HAVING AN ELECTROLUMINESCENT LAMP AND METHOD OF MAKING THE SAME

(75) Inventors: Bogdan Radu, Dearborn, MI (US); Alan G. Dry, Grosse Point Woods, MI (US)

(73) Assignee: International Automotive Components Group, LLC, New York, NY (US)

( * ) Notice: Subject to any disclaimer, the term of this patent is extended or adjusted under 35 U.S.C. 154(b) by 138 days.

(21) Appl. No.: 10/711,480

(22) Filed: Sep. 21, 2004
(Under 37 CFR 1.47)

(65) Prior Publication Data

US 2006/0062006 A1    Mar. 23, 2006

(51) Int. Cl.
*B60Q 3/06* (2006.01)
(52) U.S. Cl. .................. 362/488; 362/84; 362/154
(58) Field of Classification Search ........... 362/488, 362/154, 84, 34, 484, 489–492, 276, 802, 362/471
See application file for complete search history.

(56) References Cited

U.S. PATENT DOCUMENTS

| | | | |
|---|---|---|---|
| 2,083,753 A | 6/1937 | Turner | |
| 2,851,585 A | 9/1958 | Glowzinski | 240/2 |
| 4,104,555 A | 8/1978 | Fleming | |
| 4,573,111 A | 2/1986 | Herst et al. | |
| 4,602,358 A | 7/1986 | Sato | 369/12 |
| 4,619,624 A | 10/1986 | Kerr, III et al. | 445/22 |
| 4,670,819 A | 6/1987 | Boerema et al. | 362/501 |
| 4,875,143 A | 10/1989 | Fernandez | |
| 5,013,967 A | 5/1991 | Hirotaka et al. | |
| 5,064,974 A | 11/1991 | Vigneau et al. | 200/61.62 |
| 5,117,337 A | 5/1992 | Sakuma | |

(Continued)

FOREIGN PATENT DOCUMENTS

DE    4141297    6/1993

(Continued)

OTHER PUBLICATIONS

Author Unknown, German Office Action, dated May 5, 2006, 3 pages.

(Continued)

*Primary Examiner*—Sandra O'Shea
*Assistant Examiner*—Bao Q. Truong
(74) *Attorney, Agent, or Firm*—Wood, Herron & Evans, L.L.P.

(57) ABSTRACT

An automotive storage compartment includes a compartment body defining a cavity and having an opening for accessing the cavity. The compartment body includes a first connecting member integrally formed therein. The storage compartment further includes a cover having a second connecting member integrally formed therein, the first connecting member cooperating with the second connecting member to moveably couple the cover to the compartment body. An electroluminescent lamp is molded to the compartment body to illuminate the cavity. A two-shot molding process may be used to form the storage compartment, with the compartment body and the first connecting member being formed in the first shot. The electroluminescent lamp is molded to the compartment body in the first shot. The cover and the second connecting member are then formed in the second shot so that the cover is pivotally coupled to the compartment body.

8 Claims, 4 Drawing Sheets

U.S. PATENT DOCUMENTS

| | | | |
|---|---|---|---|
| 5,158,353 A * | 10/1992 | Kimisawa | 362/501 |
| 5,193,895 A | 3/1993 | Naruke et al. | |
| 5,434,013 A | 7/1995 | Fernandez | 428/690 |
| 5,434,757 A | 7/1995 | Kashiwagi | 362/501 |
| 5,452,190 A | 9/1995 | Priesemuth | 362/255 |
| 5,720,509 A | 2/1998 | Binish | |
| 5,780,965 A | 7/1998 | Cass et al. | 313/506 |
| 5,811,930 A | 9/1998 | Krafcik et al. | 313/510 |
| 6,000,493 A | 12/1999 | Chen | |
| 6,000,822 A | 12/1999 | Polizzi et al. | 362/488 |
| 6,013,956 A | 1/2000 | Anderson, Jr. | 307/10.1 |
| 6,116,672 A | 9/2000 | Cannon et al. | 296/37.13 |
| 6,139,304 A | 10/2000 | Centofante | 425/121 |
| 6,158,869 A | 12/2000 | Barnes, Jr. | |
| 6,160,475 A | 12/2000 | Hornung et al. | 340/461 |
| 6,193,399 B1 | 2/2001 | Hulse | 362/511 |
| 6,196,606 B1 | 3/2001 | McGoldrick | 296/37.13 |
| 6,217,201 B1 | 4/2001 | Hulse | 362/511 |
| 6,270,229 B1 | 8/2001 | Chien | |
| 6,286,983 B1 | 9/2001 | Macher et al. | 362/487 |
| 6,315,436 B1 * | 11/2001 | Schenk et al. | 362/488 |
| 6,419,379 B1 | 7/2002 | Hulse | 362/488 |
| 6,464,381 B2 * | 10/2002 | Anderson et al. | 362/488 |
| 6,536,825 B2 | 3/2003 | McAndrew et al. | 296/37.13 |
| 6,536,928 B1 | 3/2003 | Hein et al. | 362/464 |
| 6,545,418 B1 | 4/2003 | Kolpasky et al. | |
| 6,575,528 B2 | 6/2003 | Tiesler et al. | |
| 6,594,417 B1 | 7/2003 | Hulse | 385/31 |
| 6,641,276 B1 | 11/2003 | Macher et al. | |
| 6,652,128 B2 | 11/2003 | Misaras | 362/488 |
| 6,656,397 B1 | 12/2003 | Hansen et al. | 264/45.4 |
| 6,685,328 B1 | 2/2004 | Hanson et al. | |
| 6,746,067 B2 | 6/2004 | Schmidt et al. | 296/37.13 |
| 6,786,614 B2 * | 9/2004 | Ciarrocchi, Jr. | 362/101 |
| 6,929,309 B1 | 8/2005 | Radu et al. | |
| 6,945,581 B2 | 9/2005 | Taylor | 296/37.8 |
| 6,983,978 B2 | 1/2006 | Radu et al. | |
| 7,017,968 B1 | 3/2006 | Radu et al. | |
| 7,032,954 B2 | 4/2006 | Radu et al. | |
| 7,032,955 B2 | 4/2006 | Radu et al. | |
| 7,086,683 B2 | 8/2006 | Radu et al. | |
| 7,150,550 B2 | 12/2006 | Bogdan et al. | |
| 7,156,437 B2 | 1/2007 | Cowelchuk et al. | |
| 2001/0030871 A1 | 10/2001 | Anderson, Jr. et al. | 362/488 |
| 2001/0052715 A1 | 12/2001 | McAndrew et al. | |
| 2001/0053082 A1 | 12/2001 | Chipalkatti et al. | 362/496 |
| 2003/0002273 A1 | 1/2003 | Anderson, Jr. et al. | 362/84 |
| 2003/0031330 A1 | 2/2003 | Kim | |
| 2003/0048912 A1 | 3/2003 | Reich | |
| 2004/0017687 A1 | 1/2004 | Misaras | 362/489 |
| 2004/0108606 A1 | 6/2004 | Goggins | |
| 2004/0175014 A1 | 9/2004 | Liu | |
| 2005/0002199 A1 | 1/2005 | Stuffle et al. | |
| 2005/0140167 A1 | 6/2005 | Jaggi | |
| 2006/0061127 A1 | 3/2006 | Emerling et al. | |
| 2006/0271261 A1 | 11/2006 | Flores et al. | |

FOREIGN PATENT DOCUMENTS

| | | |
|---|---|---|
| DE | 195 18 169 | 11/1996 |
| DE | 29719025 | 12/1997 |
| DE | 298 08 949 | 7/1998 |
| DE | 19910973 | 10/2000 |
| DE | 10129021 | 2/2001 |
| DE | 100 10 088 | 6/2001 |
| DE | 10338898 | 8/2003 |
| DE | 10151704 | 10/2003 |
| DE | 102 40 270 | 3/2004 |
| DE | 20 2004 002 786 | 6/2004 |
| DE | 103 16 678 | 8/2004 |
| DE | 10335868 | 3/2005 |
| DE | 202005009668 | 6/2005 |
| DE | 20 2005 009 668 | 9/2005 |
| EP | 1188615 | 3/2002 |
| EP | 1298007 | 4/2003 |
| EP | 1 110 822 | 7/2004 |
| EP | 1 448 027 | 8/2004 |
| FR | 2838669 | 4/2002 |
| FR | 2838669 | 10/2003 |
| JP | 57194126 | 11/1982 |
| JP | 09086273 | 3/1997 |
| JP | 9097026 | 4/1997 |
| JP | 11162633 | 6/1999 |
| JP | 2000344011 | 12/2000 |
| JP | 2002046529 | 2/2002 |
| JP | 2002096691 | 4/2002 |
| JP | 2003086354 | 3/2003 |
| WO | 98/57097 | 12/1998 |
| WO | 01/63172 | 8/2001 |
| WO | 03/101779 | 12/2003 |

OTHER PUBLICATIONS

Notice of Allowance, dated as mailed May 25, 2006 19 pages, USPTO.

USPTO, Office Action mailed May 9, 2006 in related U.S. Appl. No. 10/711,462.

Dipl.-Ing. Ropling; Office Action, May 18, 2006; 4 pages; Deutsches Patent- und Markenarnt.

Office Action issued in a related matter, U.S. Appl. No. 10/711,462; dated as mailed on Oct. 17, 2006; 19 pages; USPTO.

Examination Report under Section 18(3) in a counterpart foreign application; dated Sep. 22, 2006; 1 page; UK Patent Office.

Office Action issued in a related U.S. Appl. No. 10/711,463; dated as mailed on Sep. 27, 2006; 31 pages; U.S. Patent and Trademark Office.

Office Action in related U.S. Appl. No. 10/710,497; dated as mailed on Jul. 27, 2006; 10 pages; U.S. Patent and Trademark Office.

Dipl.-Ing, Univ. Stefan Geisenberger; Office Action; dated Jun. 7, 2006; 3 pages, German Patent Office.

Dipl.-Ing. Gottstein; German Office Action; dated Aug. 2, 2006; 4 pages; Deutsches Patent- und Markenarnt.

Office Action issued in related U.S. Appl. No. 10/711,463; dated as mailed on Mar. 21, 2007; 13 pages; USPTO.

Final Office Action issued in related U.S. Appl. No. 10/906,667; dated as mailed on Jun. 29, 2007; 8 pages, USPTO.

Office Action issued in related U.S. Appl. No. 10/710,497; dated as mailed on Apr. 17, 2007; 7 pages; USPTO.

Office Action in related U.S. Appl. No. 10/906,667; dated as mailed on Jan. 19, 2007; 9 pages; USPTO.

Office Action issued in a related matter, U.S. Appl. No. 10/711,462; dated as mailed on Dec. 19, 2006; 8 pages; USPTO.

Combined Search and Examination Report Under Sections 17 and 18(3), The UK Patent Office, Mar. 2006.

*Office Action mailed Dec. 23, 2005*, U.S. Appl. No. 10/711,385.

*Combined Search and Examinatino Report under Sections 17 and 18*(3), The UK Patent Office, Nov. 2005.

*Office Action*, U.S. Appl. No. 10/711,462.

*Combined Search and Examination Report Under Sections 17 and 18*(3), The UK Patent Office, Jan. 2006.

*Office Action*, (No translation available to Applicant), May 2006.

*Combined Search and Examination Report Under Sections 17 and 18*(3), The UK Patent Office.

*Combined Search and Examination Report Under Sections 17 and 18*(3), The UK Patent Office, Nov. 2005.

*Combined Search and Examination Report Under Sections 17 and 18*(3), The UK Patent Office, Dec. 2005.

* cited by examiner

AUTOMOTIVE STORAGE COMPARTMENT HAVING AN ELECTROLUMINESCENT LAMP AND METHOD OF MAKING THE SAME

CROSS-REFERENCE

The present invention is related to U.S. Ser. No. 10/711,636, filed Sep. 29, 2004, U.S. Ser. No. 10/711,652, filed Sep. 29, 2004, U.S. Ser. No. 10/711,462, filed Sep. 20, 2004, U.S. Ser. No. 10/711,385, filed Sep. 15, 2004 and U.S. Ser. No. 10/711,463, filed Sep. 20, 2004.

FIELD OF THE INVENTION

The present invention pertains generally to automotive interiors and more particularly to storage compartments for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. In many of these trim assemblies, various storage compartments are incorporated therein that allow the vehicle occupant to conveniently store one or more items, such as tissue, coins, maps and other items typically carried in a vehicle. In many cases, such as for storage compartments in door panels, it is desirable for the compartment to include a door or cover that overlies the opening and secures the items within the compartment. The cover is typically attached to the compartment and moveable, such as by a hinge mechanism, so that the articles in the compartment may be accessed.

Moreover, in more luxury-oriented vehicles, manufacturers may provide various lighting systems in the trim assemblies that enhance the use of the various functional aspects typically found in the interior of an automobile. For instance, a lighting system may be provided with the storage compartment so that the various items contained therein may readily be seen during night time conditions or other conditions when the storage compartment contents may not be readily observed. In this way, the storage compartment contents may be observed and accessed without turning on overhead lighting that may disturb other vehicle occupants or temporarily blind the driver.

While being desired by car owners and vehicle occupants, storage compartments incorporating a lighting system have some drawbacks. A primary drawback is in the manufacturing and assembly of the various parts that make up the storage compartment and the lighting system. The current process for making a storage compartment is typically to form the compartment body in a first mold. The compartment door is then individually formed in a second and separate mold. A further separate connecting member, usually being a pair of metal or plastic cylindrical hinge pins, is then used to couple the compartment door to the compartment body. Moreover, current storage compartments typically include a pair of damping mechanisms to provide some resistance to opening and closing the door to the storage compartment.

To incorporate the lighting system with the storage compartment, a portion of the compartment body is cut out and covered by a clear polycarbonate material that in essence, provides a window to the interior of the storage compartment. A separate light assembly is then attached to the inside of the trim assembly into which the storage compartment is inserted so as to be located adjacent the window in the compartment body. In this way, the light assembly emits light that passes through the window and illuminates the interior of the storage compartment. The light assembly typically includes multiple parts such as an incandescent light bulb, a bulb mounting structure, a light cover, light reflectors and heat stake bosses to manage the heat generated by the incandescent bulb. The light assembly may further include contact switches so that the light bulb can be activated when the door to the storage compartment is opened.

Thus, under current manufacturing processes, storage compartments having a lighting system provided therewith comprise numerous parts each having different part numbers that must all be appropriately supplied, tracked, shipped, inventoried and eventually assembled to make the complete product. Multiple part assemblies in turn lead to significant administrative costs and labor costs, which increase the overall costs of production.

There is a need for an improved automotive storage compartment having a lighting system and a method for making the same that reduces the number of parts and reduces the labor required for assembly thereof, thereby reducing overall manufacturing costs.

SUMMARY OF THE INVENTION

The present invention provides for an improved automotive storage compartment with a lighting system having a reduced number of parts and that is adapted to be coupled to an interior trim assembly, such as a door panel, of a vehicle.

To this end, the storage compartment includes a compartment body defining a cavity having an opening and adapted to store one or more items in the cavity. The compartment body has a first connecting member integrally formed therein. The storage compartment further includes a cover having a second connecting member integrally formed therein. The first connecting member and the second connecting member cooperate to pivotally couple the cover to the compartment body. In this way, the storage compartment cover may be opened and closed to allow access to the items contained in the cavity. Additionally, an electroluminescent lamp is coupled to either the compartment body or the cover and adapted to illuminate the cavity when the cover is in the open position.

The automotive storage compartment may be formed by a two shot molding operation. In one embodiment, the electroluminescent lamp is inserted into a mold and a first mold chamber is formed about the electroluminescent lamp. In a first shot of the molding operation, a first curable material is injected into the first mold chamber to form the first element, i.e. the compartment body or cover, having a first integrated connecting member. During the first shot, the electroluminescent lamp is coupled to the first element. Next, a second mold chamber is formed about at least a portion of the first element, and more specifically, about a portion of the first connecting member. A second curable material is then injected into the second mold chamber in a second shot of the molding operation to form the second element, i.e. the other of the compartment body or cover, having a second integrated connecting member. The second element is formed so that the first connecting member and the second connecting member are pivotally coupled together. The storage compartment having the electroluminescent lamp incorporated therein may then be installed into an automotive trim assembly, such as a door panel.

By virtue of the foregoing, there is thus provided an improved automotive storage compartment with a lighting system having a reduced number of parts and that is adapted to be coupled to an interior trim assembly of a vehicle.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
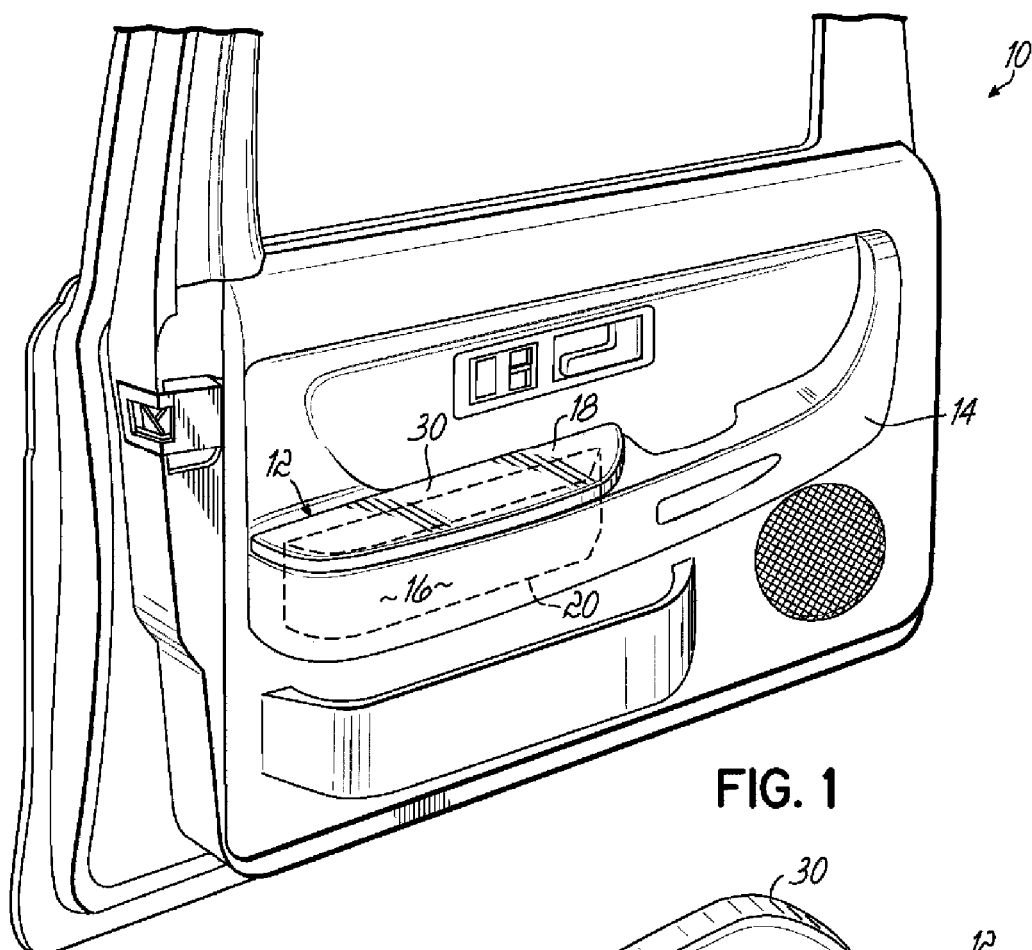
FIG. 1 is a side perspective view of an automotive trim assembly including an embodiment of the storage compartment of the present invention in the form of a door panel.

In FIG. 1, there is shown an interior trim assembly, in the form of a door panel 10 for an automobile (not shown), including an embodiment of the automotive storage compartment 12 of the present invention within a support 14 of door panel 10. The door panel 10 covers a portion of the interior of the automobile door to provide a more aesthetically pleasing environment, as well as additional comfort to the vehicle's occupants. Other various trim assemblies in the automobile, such as instrument panels, rear passenger side panels and consoles, are generally constructed in a similar fashion and may benefit from the present invention. Thus, while the following detailed description focuses on the storage compartment 12 being included in a door panel 10, those having ordinary skill in the art will recognize that the storage compartment 12 may equally be incorporated in other automotive trim assemblies.

The door panel 10 includes a support 14 including a relatively rigid substrate, which receives the storage compartment 12 and which forms at least a portion of the structural support and defines the general shape of the door panel 10. The door panel 10 may be secured to the interior of the automobile, for example, by a bracket or mounting member (not shown) as is known in the art. The door panel 10 further includes a front surface 16 that faces the interior of the automobile and a back surface (not shown) opposite the front surface 16 that is hidden from view when the panel assembly 10 is mounted to the automobile. As shown in FIG. 1, storage compartment 12 may be incorporated into door panel 10 and cooperate with other features, such as armrest 18, to hide the storage compartment 12 from view.

Figure 2:
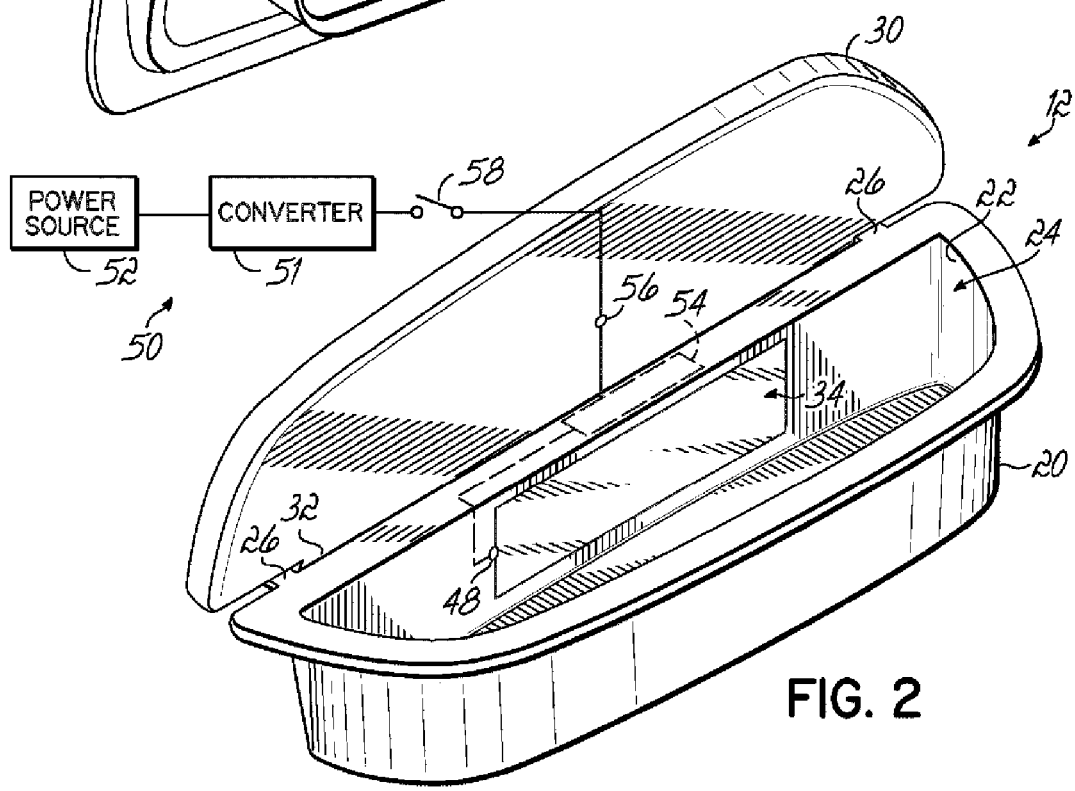
FIG. 2 is a perspective view of the storage compartment of FIG. 1 showing the electroluminescent lamp.

As best shown in FIG. 2, the storage compartment 12 includes a compartment body 20 defining a cavity 22 having an opening 24 for gaining access to the cavity 22. The cavity 22 is adapted to store one or more items such as coins, tissue, maps and the like. The compartment body 20 further includes a pair of spaced apart connecting members 26 integrally formed therein. While two connecting members 26 are shown in FIG. 2, it should be understood by those of ordinary skill in the art that one connecting member or more than two connecting members may be integrally formed with the compartment body 20. The compartment body 20 is made of a thermoplastic material such as a thermoplastic synthetic resin. For example, the compartment body 20 may be formed from polybutylene terephthalate or polyamide 12. The storage compartment 12 also has a cover 30 including one connecting member 32 integrally formed therein. It similarly should be understood by those having ordinary skill in the art that more than one connecting member 32 may be integrally formed with the cover 30. The cover 30 is made of a thermoplastic material such as a thermoplastic synthetic resin. For example, the cover 30 may be formed from polypropylene, polyoxymethylene, or polyamide 6.

As more fully explained in U.S. patent application Ser. No. 10/710,497, which is assigned to assignee of the present invention and incorporated by reference herein in its entirety, each integral connecting member 26 of the compartment body 20 includes a projecting portion defining a pin having an enlarged distal end configured as a circular portion or ball. The integral connecting member 32 of the cover 30 includes a pair of spaced apart receiving portions defining a bore having an enlarged receiving portion configured as a circular recess. Accordingly, the connecting members 26 of the compartment body 20 cooperate with the connecting member 32 of the cover 30 to couple the cover 30 to the compartment body 20, and more specifically, each circular recess receives one of the circular portions to pivotally couple the cover 30 to the compartment body 20. In this way, the cover 30 is moveable between an open position, wherein the cavity 22 is accessible through the opening 24, and a closed position, wherein the cover 30 overlies the opening 24. The storage compartment 12 may further include one or more hinge springs (not shown) cooperating with the compartment body 20 and the cover 30 to assist with movement of the cover 30 from the open position to the closed position.

Figure 3:
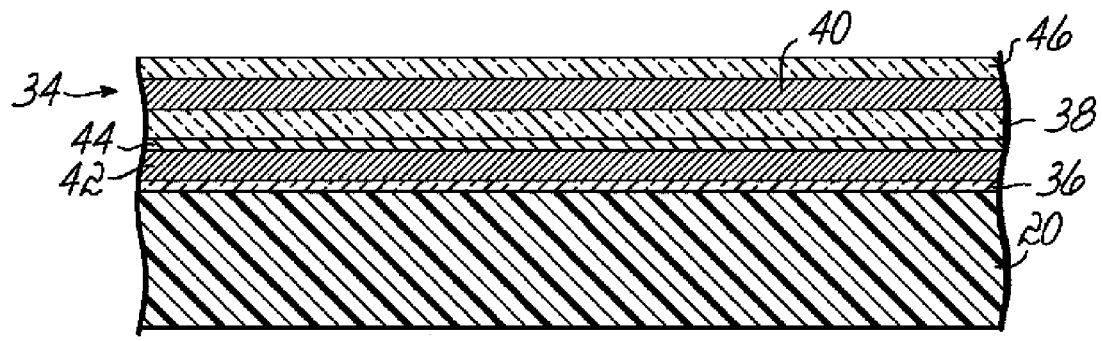
FIG. 3 is a detailed partial cross-sectional view of the electroluminescent lamp shown in FIG. 2.

As shown in FIG. 2, to provide lighting to the storage compartment 12, an electroluminescent (EL) lamp, generally shown at 34, may be coupled to the compartment body 20 and configured to illuminate the various items placed inside cavity 22. Although the EL lamp 34 is shown coupled to the compartment body 20, it should be recognized that the EL lamp 34 may alternately be coupled to cover 30. As shown in FIG. 3, the EL lamp 34 consists of a stacked structure of multiple layers carried on a suitable flexible structural substrate 36. The layered structure includes a layer of EL phosphor 38 disposed between substantially parallel front and rear electrodes 40 and 42, respectively. The phosphor layer 38 is contiguous with the front electrode 40 but spaced from, and electrically isolated from, the rear electrode 42 by a dielectric layer 44. The front electrode 40, which faces into the interior of cavity 22, is light transmissive (i.e., transparent or translucent) for transmitting light emitted from the phosphor layer 38 when an electric field is applied between the front and rear electrodes 40, 42. The dielectric layer 44 may be pigmented to supply a dark or colored background for the emitted light.

A protective encapsulation layer 46 of a light-transmissive substance, such as a polycarbonate or another polymer suitable for this application, optionally covers the front electrode 40 of the EL lamp 34. The encapsulation layer 46 may be applied to the stacked structure as a printed ink layer. An electrical connector 48, shown diagrammatically in FIG. 2, such as an edge electrical connector, includes power contacts that are coupled with the front and rear electrodes 40, 42. The power contacts of the electrical connector 48 are exposed through the encapsulation layer 46 for establishing electrical contacts.

The layers of the EL lamp 34 may be printed onto the EL substrate 36 by rotary screen printing, flexographic printing, or other printing methods using conducting, insulating and electroluminescent ink compositions. The ink compositions are printed across a desired print area on the EL substrate 36 and then dried to remove volatile solvents for forming stable layers. Some of the layers in the stacked structure may be printed more than once in order to assure proper thickness. Phosphor ink compositions are available to emit light in many colors, such as green, blue, and yellow, and may also be blended to produce white light emission. Typical EL phosphors comprise zinc sulfide-based materials doped to create the desired color emission. Suitable EL phosphor ink compositions include white, blue-green and yellow-green LUXPRINT® electroluminescent inks commercially available from DuPont Microcircuit Materials (Research Triangle Park, N.C.).

In one embodiment of the invention, a flexible metallized film may effectively function as the EL substrate 36, the rear electrode 42 and the dielectric layer 44 of the EL lamp 34. Such metallized films include a thin layer of a metallic conductive material, like aluminum, deposited on one side of a film material, like polyester. The deposited metallic layer operates as the rear electrode 42 and the film material acts as the dielectric layer 44. The metallized film also serves as a EL substrate 36 for application of the remaining printed component layers of the stacked structure.

Referring again to FIG. 2, the trim assembly further includes an electrical circuit 50, typically including an inverter or converter 51, that electrically couples a power source 52, such as the vehicle battery, with the electrical connector 48. To this end, the compartment body 20 includes a first electrical connector 54, such as a pin connector, that is electrically coupled to the EL electrical connector 48. For example, the first electrical connector 54 may be positioned on the underside of the rim of the compartment body 20. Furthermore, the trim assembly may include a second electrical connector 56, shown diagrammatically in FIG. 2, electrically coupled to power source 52. For example, second electrical connector 56 may be positioned in support 14 into which storage compartment 12 is inserted. First and second electrical connectors 54, 56 are configured such that when storage compartment 12 is inserted into door panel 10, the first electrical connector 54 engages, or is otherwise electrically coupled to, electrical connector 56 so as to energize EL lamp 34. Electrical circuit 50 may further include a switch 58 for selectively energizing the EL lamp 34. For example, power to the EL lamp 34 may be switched in coordination with the operation of the cover 30 to the storage compartment 12 so that the EL lamp 34 is energized only when the cover 30 is opened. Additional circuitry, as recognized by persons of ordinary skill in the art, may be provided as required to ensure proper operation of the EL lamp 34.

The converter 51 electrically couples a direct current (DC) electrical system of the vehicle, such as the vehicle battery, with the electrical connector 48. The converter 51 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Application of the AC driving voltage across the front and rear electrodes 40, 42 of the EL lamp 34 generates a varying electric field within the phosphor layer 38 causing the constituent phosphor particles to emit visible light. In general, the brightness of the EL lamp 34 increases with increased voltage and frequency.

The visible light emitted by the EL lamp 34 uniformly and effectively illuminates the inside of the cavity 22. The EL lamp 34 has a low power consumption and a very low heat generation as compared with conventional lamps used in such automotive applications. Furthermore, the EL lamp 34 is sturdy and exhibits excellent vibration and impact resistance. The EL lamp 34 will have a lengthy life and, as a result, will not normally need replacement over the life of the automobile, in contrast to the need to periodically replace burnt-out conventional incandescent bulbs. Moreover the resin materials used to form compartment body 20 and/or cover 30 need not be heat resistant as the EL lamp 34 has a cooler operating temperature than conventional incandescent bulbs.

Figure 4A:
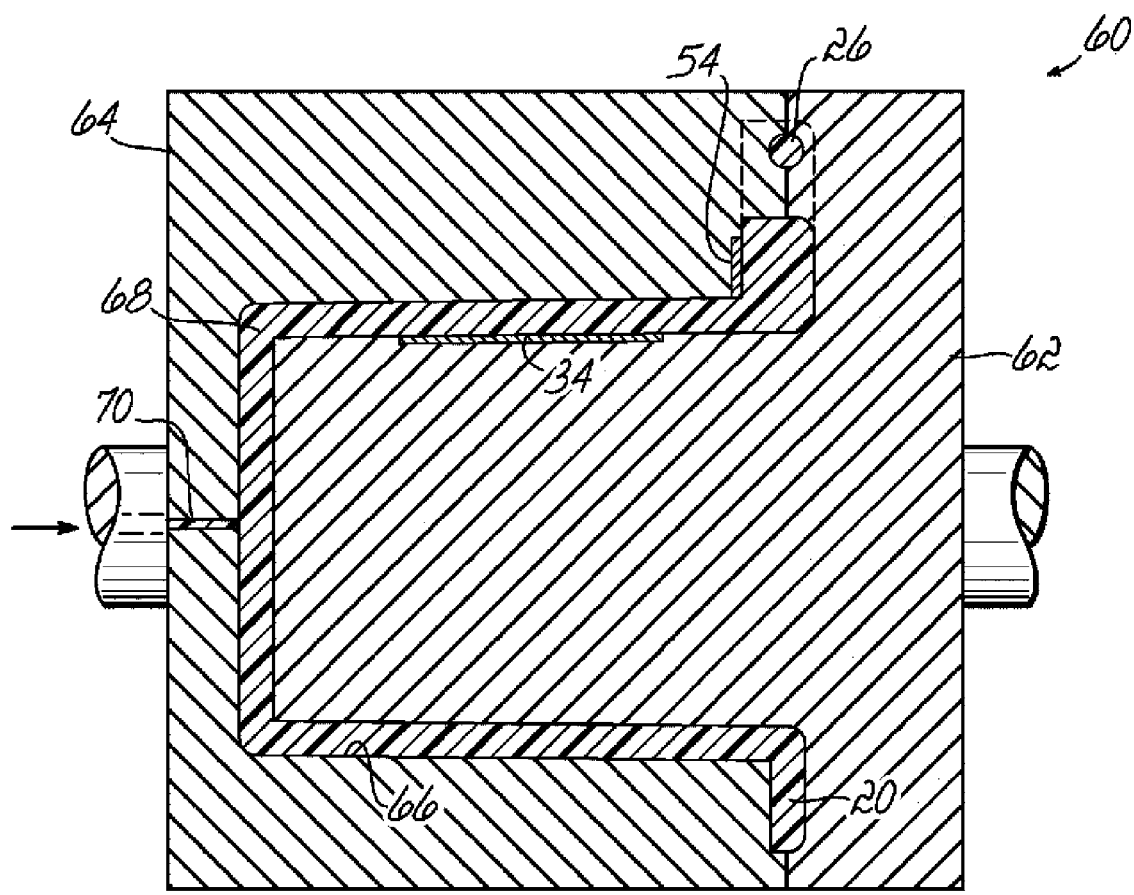
FIGS. 4A-4C are diagrammatic cross-sectional views illustrating a molding process for forming the storage compartment of the present invention.
Figure 4B:
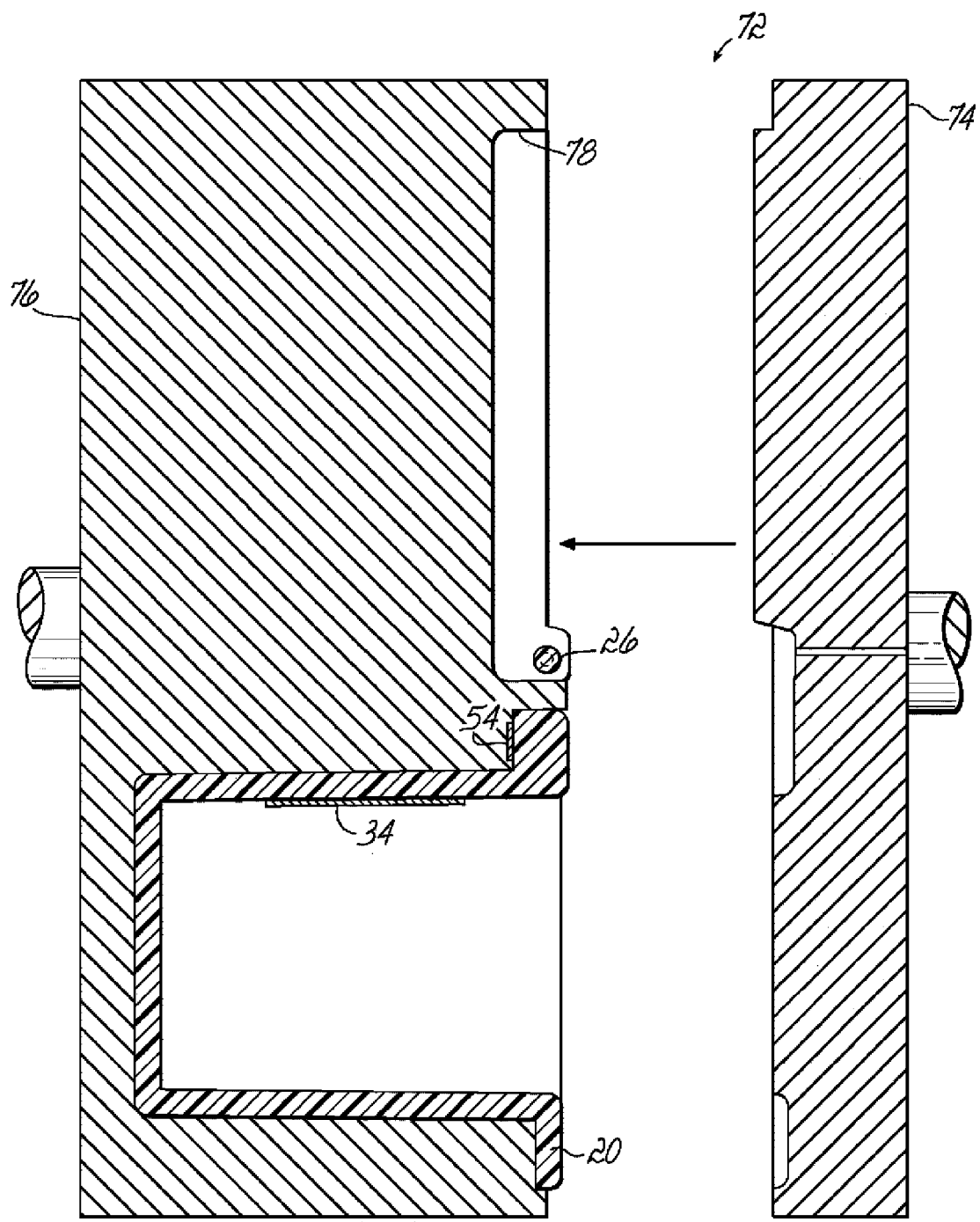
Figure 4C:
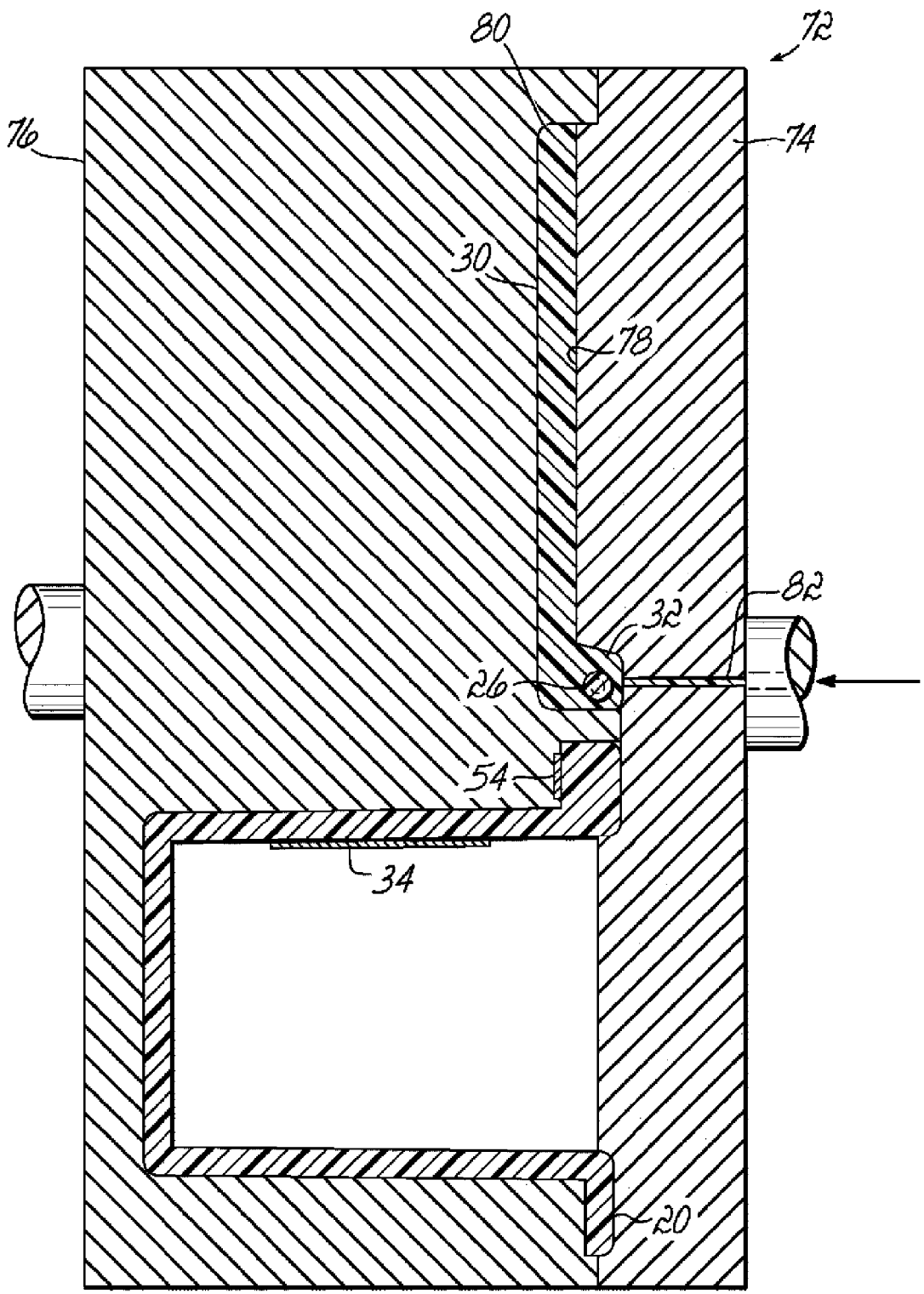

With reference to FIGS. 4A-4C, a method of making the storage compartment 12 of the present invention will now be described. More specifically, the storage compartment 12 is formed by a two-shot molding operation wherein a first shot molds one of either the compartment body 20 or the cover 30. The EL lamp 34 is integrally molded to either the compartment body 20 or the cover 30 during the first shot. A second shot then molds the other of the compartment body 20 or cover 30 to couple the parts together.

To this end, and as shown in FIG. 4A, a first mold 60 is shown having first and second mold sections 62 and 64, respectively, that define a first mold chamber or cavity 66 adapted to mold a first element, i.e., the compartment body 20, in the first shot. The EL lamp 34 is placed at a specific location between the first and second mold sections 62, 64 and the mold 60 is closed. A first curable material 68 is then injected through a channel 70, into the first cavity 66. The first curable material 68 may be any engineering polymer material suitable for the specific application, such as polybutylene terephthalate and polyamide 12. The injection molding process creates sufficient pressure and heat to bond the EL lamp 34 and the first curable material 68 to form the compartment body 20 and EL lamp 34 as an integral structure. Alternately, first mold 60 may be configured so that first curable material 68 overmolds a portion of EL lamp 34, such as along its periphery, to couple the EL lamp 34 thereto. Additionally, first electrical connector 54 may be located at a specific location between first and second mold sections 62, 64 so that first electrical connector 54 is molded to compartment body 20 during the first shot of the molding operation.

With reference to FIGS. 4B-4C, after the compartment body 20 is molded having the EL lamp 34 integrally molded thereto, the compartment body 20 is moved to the second mold 72 having first and second mold sections 74 and 76, respectively, that define a second mold chamber or cavity 78 adapted to mold a second element, i.e., the cover 30, in the second shot of the molding process. Movement of the compartment body 20 to the second mold 72 can occur by methods commonly known in the art such as by hand, i.e. manually, by robotic means, or by utilizing a rotating mold assembly. With respect to the rotating mold assembly (not shown), the first element, e.g. the compartment body, may be formed in a first mold as stated above. The first mold is then opened and the first element, rather than being manually or robotically moved, is rotated, e.g. 180 degrees, on a rotating platen to coordinate with a second mold to form the second element, e.g. the cover. The rotating mold assembly advantageously allows for simultaneous molding of first and second elements.

After the compartment body 20 has been moved to the second mold 72, a portion of the connecting members 26 is received within the second cavity 78 of the second mold 72 so that when the second mold 72 is closed, second cavity 78 is formed around a portion of connecting members 26. A second curable material 80 is then injected through a channel 82 and into second cavity 78. As explained in more detail in U.S. patent application Ser. No. 10/710,497, this second curable material 80 has a lower melting point than the first curable material 68. Accordingly, the second material 80 is provided at a lower temperature than the melting point of the first material 58 so as to avoid fusion of the connecting members 26, 32 on the compartment body 20 and cover 30, respectively. The second material 80 may be a thermoplastic material such as polypropylene, polyoxymethylene, polyamide 6 or other suitable materials.

After the storage compartment 12 is formed, the second mold 72 may be opened and the storage compartment 12 ejected therefrom. The two-shot molding process advantageously provides a unitary storage compartment 12 comprising a compartment body 20, a cover 30 pivotally coupled thereto, and an EL lamp 34 integrally molded to the compartment body 20 to illuminate the items stored therein. The unitary storage compartment 12 may now be received within support 14 of the door panel 10 during assembly of door panel 10. It should be recognized that additional manufacturing operations may be performed on storage compartment 12. For example a foam pad may be coupled to the top surface of cover 30 so that cover 30 functions as an armrest 18 for door panel 10. Those having ordinary skill in the art will recognize that the storage compartment 12 may equally be included in other automotive trim assemblies, e.g. instrument trim panels, rear passenger side panels, center consoles and others.

Although the above method has described molding the first element as the compartment body 20 and molding the second element as the cover 30, it should be understood that the cover 30, alternatively, could be molded as the first element while the compartment body 20, alternatively, could be molded as the second element. Moreover, the EL lamp 34 may be molded to either the compartment body 20 or cover 30 during the first or second shot of the molding operation.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly, comprising:
a support; and
a storage compartment coupled to said support and adapted to store one or more items, said storage compartment comprising:
a compartment body defining a cavity adapted to store the one or more items and having an opening for gaining access to said cavity; and
a cover coupled to said compartment body and moveable between an open position, wherein said cavity is accessible through said opening, and a closed position, wherein said cover overlies said opening; and
an electroluminescent lamp molded to one of said compartment body and said cover and adapted to illuminate said cavity when said cover is in the open position.

2. The trim assembly of claim 1, wherein said electroluminescent lamp is molded to the compartment body.

3. The trim assembly of claim 1, wherein said electroluminescent lamp is molded to the cover.

4. The trim assembly of claim 1 further comprising:
an electrical circuit for energizing said electroluminescent lamp.

5. The trim assembly of claim 4, wherein said electrical circuit comprises:
a power source;
a first electrical connector rigidly coupled to said compartment body and electrically coupled to said electroluminescent lamp; and
a second electrical connector rigidly coupled to said support and electrically coupled to said power source, wherein said first electrical connector contacts said second electrical connector when said storage compartment is coupled to said support so as to energize said electroluminescent lamp.

6. The trim assembly of claim 4, further comprising:
an electrical switch having a first position that energizes the electroluminescent lamp and a second position that de-energizes the electroluminescent lamp.

7. The trim assembly of claim 6, wherein said electrical switch is in the first position when said cover is in the open position and said electrical switch is in the second position when said cover is in the closed position.

8. An automotive interior trim assembly, comprising:
a support; and
a storage compartment coupled to said support and adapted to store one or more items, said storage compartment comprising:
a compartment body defining a cavity adapted to store the one or more items and having an opening for gaining access to said cavity, said compartment body including a first connecting member integrally formed therein; and
a cover including a second connecting member integrally formed therein, said first connecting member cooperating with said second connecting member to couple said cover to said compartment body, said cover being moveable between an open position, wherein said cavity is accessible through said opening, and a closed position, wherein said cover overlies said opening; and
an electroluminescent lamp coupled to one of said compartment body and said cover and adapted to illuminate said cavity when said cover is in the open position.

* * * * *